United States Patent
Takeuchi

(10) Patent No.: US 9,131,151 B2
(45) Date of Patent: Sep. 8, 2015

(54) IMAGE CAPTURING APPARATUS PERFORMING DEVELOPMENT PROCESSING ON COMPOSITE IMAGE AND CONTROL METHOD THEREOF

(71) Applicant: CANON KABUSHIKI KAISHA, Tokyo (JP)

(72) Inventor: Yoshitaka Takeuchi, Higashikurume (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/260,574

(22) Filed: Apr. 24, 2014

(65) Prior Publication Data
US 2014/0333791 A1 Nov. 13, 2014

(30) Foreign Application Priority Data
May 7, 2013 (JP) .................... 2013-097999

(51) Int. Cl.
*H04N 5/232* (2006.01)
*H04N 1/387* (2006.01)
*H04N 9/64* (2006.01)
*H04N 9/68* (2006.01)
*H04N 5/262* (2006.01)

(52) U.S. Cl.
CPC .......... *H04N 5/23232* (2013.01); *H04N 1/3871* (2013.01); *H04N 9/646* (2013.01); *H04N 9/68* (2013.01); *H04N 5/2621* (2013.01)

(58) Field of Classification Search
CPC .......... H04N 5/23229; H04N 5/23232; H04N 1/3871; H04N 9/646; H04N 9/68; G06T 3/0056
See application file for complete search history.

(56) References Cited

U.S. PATENT DOCUMENTS

2008/0251695 A1* 10/2008 Kamon ..................... 250/208.1

FOREIGN PATENT DOCUMENTS

| JP | 10-271427 A | 10/1998 |
|----|-------------|---------|
| JP | 2002-300372 A | 10/2002 |

* cited by examiner

*Primary Examiner* — Paul Berardesca
(74) *Attorney, Agent, or Firm* — Cowan, Liebowitz & Latman, P.C.

(57) ABSTRACT

An image capturing apparatus comprises an image capturing unit configured to capture images by an image sensor; an acquisition unit configured to acquire information relating to sensitivities of the image sensor used for capturing the images; a composition unit configured to add a plurality of images for generating a composite image; and a development processing unit configured to perform development processing of data of the composite image generated by the composition unit; wherein a plurality of parameters having different characteristics corresponding to the sensitivities of the image sensor are provided as the parameters used for the development processing; further comprising a control unit configured to perform controlling to compare the sensitivities used for shooting the plurality of images and set the parameter corresponding to the highest sensitivity as the parameter used for the development processing.

6 Claims, 13 Drawing Sheets

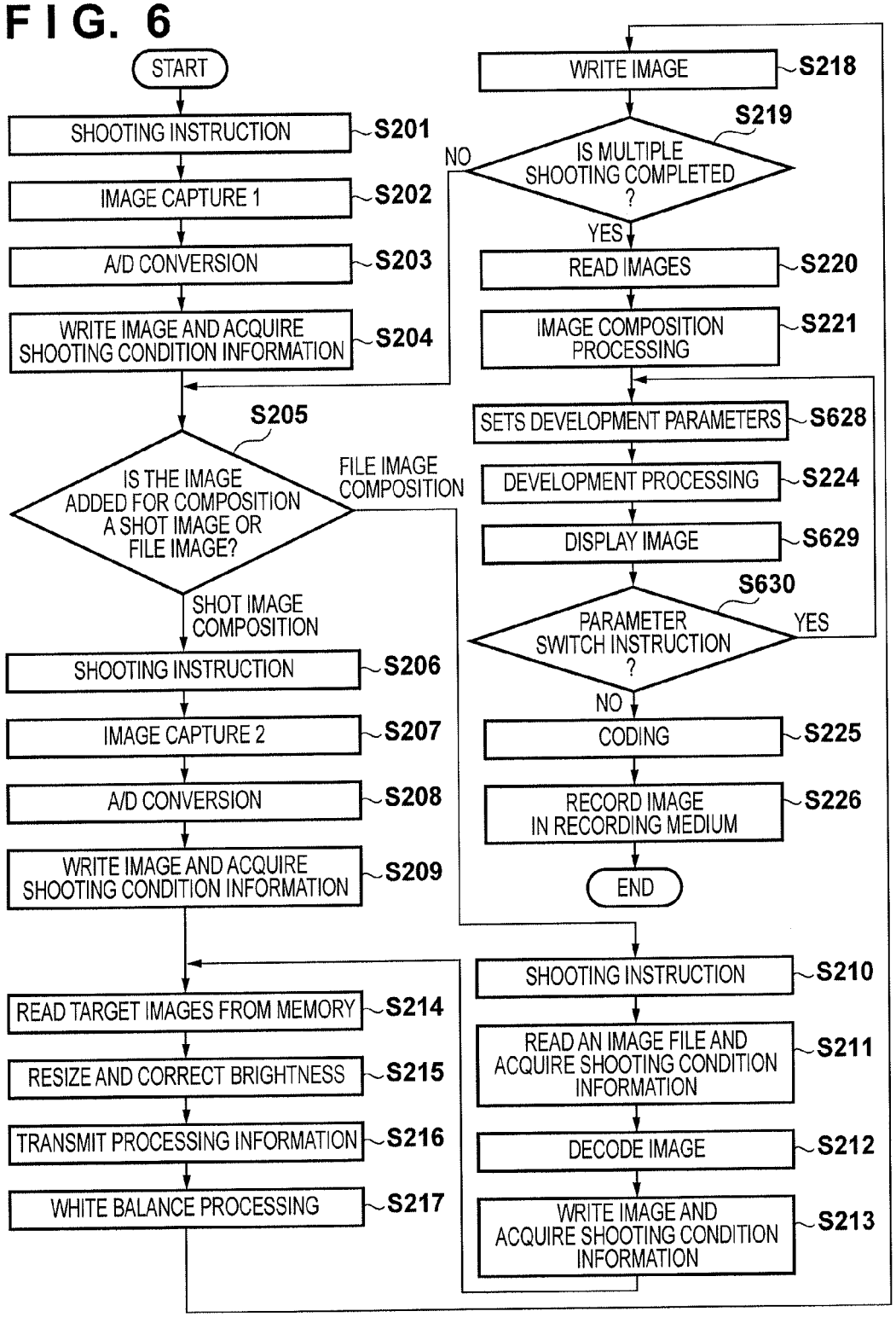

| 1/16 | 2/16 | 1/16 |
|---|---|---|
| 2/16 | 4/16 | 2/16 |
| 1/16 | 2/16 | 1/16 |

FIG. 8B

| 1/256 | 4/256 | 6/256 | 4/256 | 1/256 |
|---|---|---|---|---|
| 4/256 | 16/256 | 16/256 | 16/256 | 4/256 |
| 6/256 | 24/256 | 36/256 | 16/256 | 6/256 |
| 4/256 | 16/256 | 16/256 | 16/256 | 4/256 |
| 1/256 | 4/256 | 6/256 | 4/256 | 1/256 |

FIG. 8C

| 1/4096 | 6/4096 | 15/4096 | 20/4096 | 15/4096 | 6/4096 | 1/4096 |
|---|---|---|---|---|---|---|
| 6/4096 | 36/4096 | 90/4096 | 120/4096 | 90/4096 | 36/4096 | 6/4096 |
| 15/4096 | 90/4096 | 225/4096 | 300/4096 | 225/4096 | 90/4096 | 15/4096 |
| 20/4096 | 120/4096 | 300/4096 | 400/4096 | 300/4096 | 120/4096 | 20/4096 |
| 15/4096 | 90/4096 | 225/4096 | 300/4096 | 225/4096 | 90/4096 | 15/4096 |
| 6/4096 | 36/4096 | 90/4096 | 120/4096 | 90/4096 | 36/4096 | 6/4096 |
| 1/4096 | 6/4096 | 15/4096 | 20/4096 | 15/4096 | 6/4096 | 1/4096 |

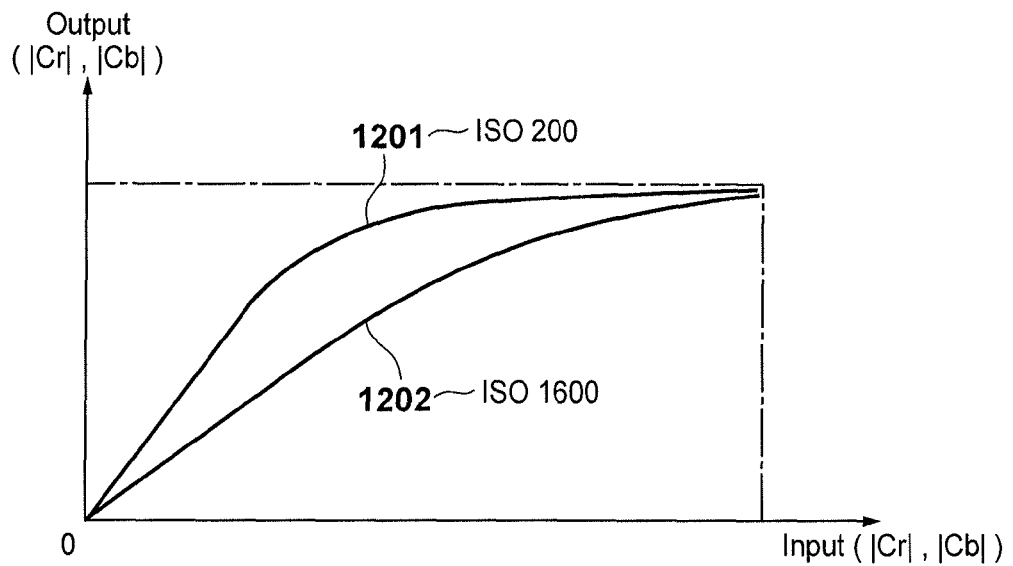
F I G. 12A
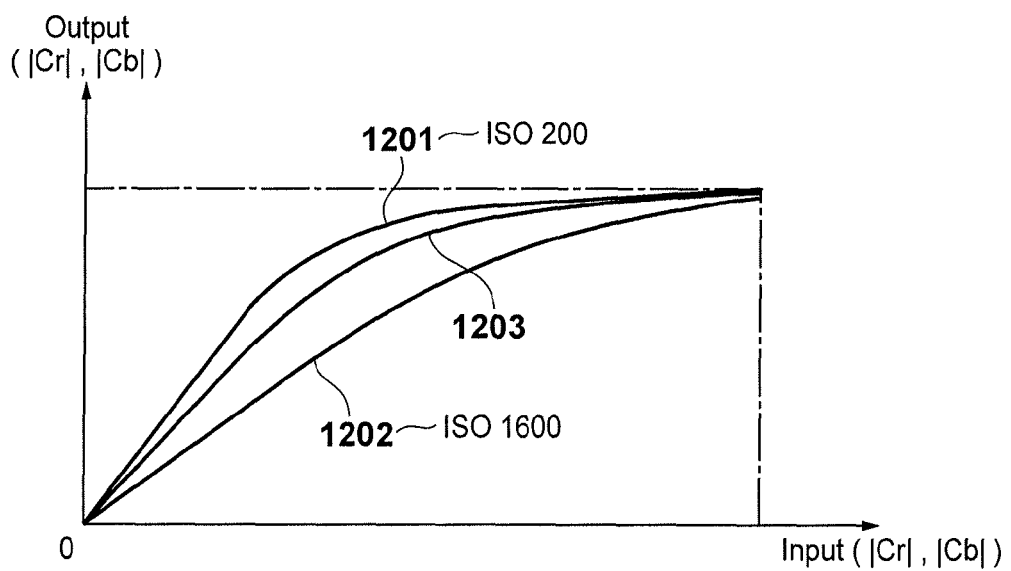
F I G. 12B

IMAGE CAPTURING APPARATUS PERFORMING DEVELOPMENT PROCESSING ON COMPOSITE IMAGE AND CONTROL METHOD THEREOF

BACKGROUND OF THE INVENTION

1. Field of the Invention

The present invention relates to the technique for multiple shooting of images.

2. Description of the Related Art

Multiple shooting is a technique to create splendid visual effects that cannot be achieved from a single shot by composing an image either from multiple shots of an object or from an image decoded from an image file and a shot image. As used herein, the processing of adding a piece of image data to another is referred to as composition and repeated shooting of images is referred to as multiple shooting.

For example, Japanese Patent Laid-Open No. 10-271427 describes a method of adding a shot image and a separate image for composition to generate a composite image. This method comprises converting the image for composition based on information obtained during the shooting of the shot image before generating the composite image. Additionally, Japanese Patent Laid-Open No. 2002-300372 describes a method of recording composite image data along with information for restoring the pre-composition image data.

However, if multiple shooting is performed under conditions with different ISO speeds or conditions with different resize rates or different brightness correction gains, images with different amounts of noise, dynamic ranges, and resolutions are added to generate a composite image. This may results in inadequate parameters for development processing, thus adversely affecting the appearance of the image.

SUMMARY OF THE INVENTION

The present invention has been made in consideration of the aforementioned problems, and realizes a technique for using optimum parameters for performing suitable image processing so as to obtain images with low noise even when multiple shooting is performed under different shooting conditions.

In order to solve the aforementioned problems, the present invention provides an image capturing apparatus comprising: an image capturing unit configured to capture images by an image sensor; an acquisition unit configured to acquire information relating to sensitivities of the image sensor used for capturing the images; a composition unit configured to add a plurality of images for generating a composite image; and a development processing unit configured to perform development processing of data of the composite image generated by the composition unit; wherein a plurality of parameters having different characteristics corresponding to the sensitivities of the image sensor are provided as the parameters used for the development processing; further comprising a control unit configured to perform controlling to compare the sensitivities used for shooting the plurality of images and set the parameter corresponding to the highest sensitivity as the parameter used for the development processing.

In order to solve the aforementioned problems, the present invention provides a control method of an image capturing apparatus which has an image capturing unit for capturing images by an image sensor, an acquisition unit configured to acquire information relating to sensitivities of the image sensor used for capturing the images, a composition unit configured to add a plurality of images for generating a composite image, and a development processing unit configured to perform development processing of data of the composite image generated by the composition unit; the method comprising the steps of: providing a plurality of parameters having different characteristics corresponding to the sensitivities of the image sensor as the parameters used for the development processing, and performing controlling to compare the sensitivities used for shooting the plurality of images and set the parameter corresponding to the highest sensitivity as the parameter used for the development processing.

According to the present invention, images with low noise can be obtained by using optimum parameters for performing suitable image processing even when multiple shooting is performed under different shooting conditions.

Further features of the present invention will become apparent from the following description of exemplary embodiments (with reference to the attached drawings).

BRIEF DESCRIPTION OF THE DRAWINGS

FIG. 6 is a flowchart showing a process of multiple shooting and a process of generating a composite image according to a third embodiment.

FIGS. 7A-7J illustrate examples of arrays of pixels in development processing.

FIGS. 8A-8C illustrate examples of filter coefficients used in luminance and color noise reduction processing.

FIGS. 12A-12B illustrate examples of input/output characteristics of color signals in saturation correction processing.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

The present invention will be described hereinafter as applied to image capturing apparatus for shooting moving and/or still images, such as digital cameras. The present invention, however, can be applied to other mobile electronic instruments, such as smart phones.

First Embodiment

Figure 1:
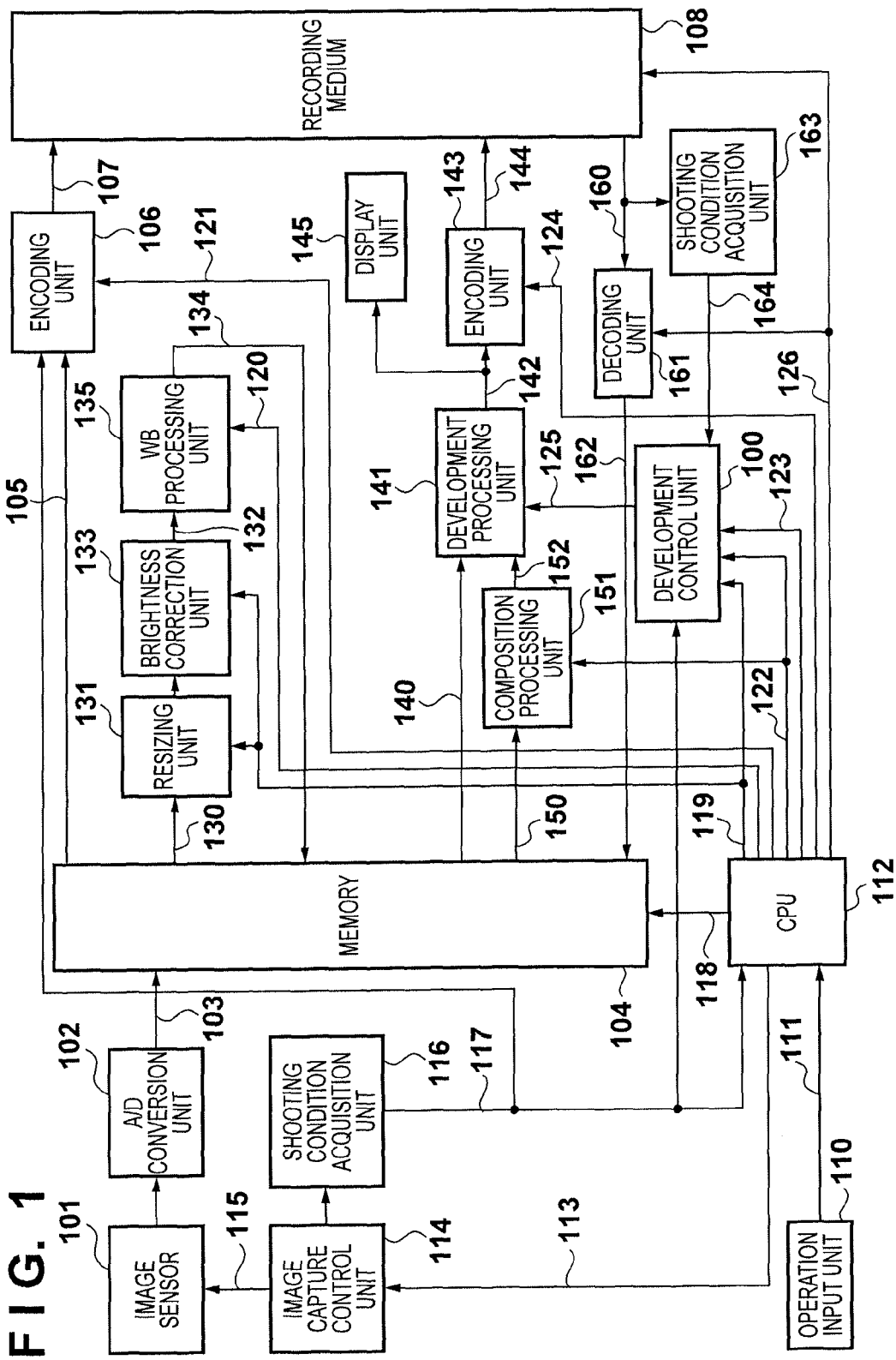
FIG. 1 is a block diagram showing the configuration of an apparatus according to an embodiment of the present invention.

A first embodiment will be described hereinafter with reference to FIGS. 1-3. Throughout the specification, the processing of adding images is referred to as composition and repeated shooting of images is referred to as multiple shooting.

In this embodiment, an object is shot in multiple shots, image data is recorded in a memory along with the shooting conditions for each shot, and, after image composition, optimum parameters are selected from a plurality of development parameters corresponding to the shooting conditions so as to perform development processing.

Apparatus Configuration

A configuration and operation of a digital camera according to this embodiment will be described hereinafter with specific reference to FIG. 1.

The digital camera of this embodiment has a function of generating a composite image by adding multiplely shot first image data with second image data or, instead of the second image data, third image data decoded from an image file that has been already recorded. In particular, the digital camera adds linear image data that are read out from an image sensor 101 and converted to digital signals and then performs nonlinear development processing to complete a final image. This maintains the linearity of the images added for composition and realizes composition processing that linearly corresponds to the exposure values of the shooting. In other words, image composition from images shot at the same exposure value will produce image quality equivalent to that shot at an exposure value of twice the exposure (1 EV).

According to a shooting instruction signal 111 from an operation input unit 110, a CPU 112 outputs an image capture control signal 113 to an image capture control unit 114. The operation input unit 110 is comprised of a variety of operating members, such as various types of switches, buttons, and a touch panel, for receiving various instructions based on user operations.

According to the image capture control signal 113 received from the CPU 112, the image capture control unit 114 drives the lens, diaphragm, and shutter of the optical system (not shown) and outputs a driving signal 115 to the image sensor 101, thereby capturing the object image formed on the imaging surface of the image sensor 101 via the optical system. The image sensor 101 is a single plate image sensor that includes an imaging sensor, such as a CCD or CMOS, for converting the object image into an electrical signal and has color filters for multiple colors of red (R), green (G), and blue (B) arranged in a Bayer array.

An analog signal outputted by the image sensor 101 is converted by an analogue-digital (A/D) conversion unit 102 into a digital signal 103 and recorded as the first image data at a predetermined address of the memory 104.

According to an image record instruction signal 111 from the operation input unit 110, the CPU 112 outputs an encoding control signal 121 to an encoding unit 106. According to the encoding control signal 121 received from the CPU 112, the encoding unit 106 reads out the first image data 105 from the memory 104, generates and records an image file 107 of the image data in a recording medium 108, such as a memory card.

The image data in the image file 107 recorded in the recording medium 108 is called RAW data, which is linear data on which nonlinear development processing is yet to be performed (also referred to as "RAW image data" hereinafter).

A shooting condition acquisition unit 116 acquires from the image capture control unit 114 shooting condition information 117, such as ISO speed (sensitivity), shutter speed, f-stop, focal length, and focus position, used for shooting the first image data recorded in the memory 104, and sends the information to the CPU 112.

Next, the CPU 112 generates second image data to be added with the first image data for generating a composite image. If the second image data is generated by shooting as in the case of the first image data, the object image is captured by following the same procedure as for the first image data and recorded at a predetermined address for the second image data in the memory 104. However, if RAW image data is already recorded as an image file in the recording medium 108, the image data may be decoded from that image file to obtain second image data.

In response to a file readout instruction signal 111 from the operation input unit 110, the CPU 112 outputs a readout control signal 126 to the recording medium 108.

According to the readout control signal 126 received from the CPU 112, the decoding unit 161 reads an image file 160 from the recording medium 108, decodes the image file 160 back to its original, pre-record RAW image data 162, and subsequently records the image data at a predetermined address for the second image data in the memory 104.

A shooting condition acquisition unit 163 acquires shooting condition information 164 from the image file 160 that is read by the decoding unit 161 from the recording medium 108 and sends the information to a development control unit 100. The shooting condition information includes the ISO speed, shutter speed, f-stop, focal length, and focus position, etc.

Next, the CPU 112 generates a composite image from a plurality of multiplely shot images or decoded image data.

The first image data and the second image data recorded in the memory 104, before being added to generate a composite image, is subjected to resizing processing by two-dimensionally spatial linear interpolation at a resizing unit 131 and to digital gain processing at a brightness correction unit 133. If the first and second image data is added to generate a composite image by using the same number of pixels and matching the angle of view for both pieces of image data, the number of pixels of the smaller image data is resized to match the size of the larger image. Alternatively, to change the brightness of one or both of the first and second image data, digital gain is applied to the relevant image data. In particular, the resizing unit 131 and the brightness correction unit 133 read the first and second image data 130 from the memory 104 and perform resizing and brightness correction according to the resizing control signal and the brightness correction control signal 119 received from the CPU 112.

Furthermore, the CPU 112 outputs a white balance (WB) control signal 120 to a WB processing unit 135 according to a WB instruction signal 111 from the operation input unit 110. The WB processing unit 135 then carries out white balance processing on the image data 132 after the resizing and brightness correction according to the WB control signal 120 received from the CPU 112.

After undergoing the white balance processing, the first and second image data is recorded in their predetermined areas of the memory 104 as the third and fourth image data 134, respectively. In this way, once image processing is completed, the first and second image data is sequentially written back to the memory 104 as the third and fourth image data, respectively.

Next, the CPU 112 outputs a composition control signal 122 to a composition processing unit 151 according to the WB instruction signal 111 from the operation input unit 110.

In response to a composition control signal 122 received from the CPU 112, the composition processing unit 151 reads the third and fourth image data 150 from the memory 104 and performs addition of the pixels at the same positions.

A composite image data 152 generated at the composition processing unit 151 is subjected to development processing at the development processing unit 141. The development processing unit 141 comprises a circuit that can be also used for developing RAW image data 140 obtained by a standard single image shooting as opposed to image data from multiple shooting. As such, the RAW image data 140 and the composite image data 152 are both entered into the common input of the development processing unit 141.

The development processing unit 141, according to a development control signal 125 for controlling the development parameters received from the development control unit 100, performs nonlinear development processing on the linear composite image data 152 to enhance the appearance of the image, subsequently generating and outputting a final image data 142 to the display device 145. Then, the user can confirm the quality of the final image shown on the display device 145.

The final image data 142 is compressed into an image file 144 in the JPEG or other suitable compression format at an encoding unit 143 and recorded in the recording medium 108.

The development control unit 100 receives the shooting condition information 117, 164, the resizing control signal and the brightness correction control signal 119, the composition control signal 122, and the development control signal 125 and outputs the development control signal 125 for controlling the development processing to the development processing unit 141 based on the foregoing information and signals.

Multiple Shooting and Image Composition

Multiple shooting and image composition by the digital camera according to this embodiment will be described hereinafter with reference to FIG. 2.

Figure 2:
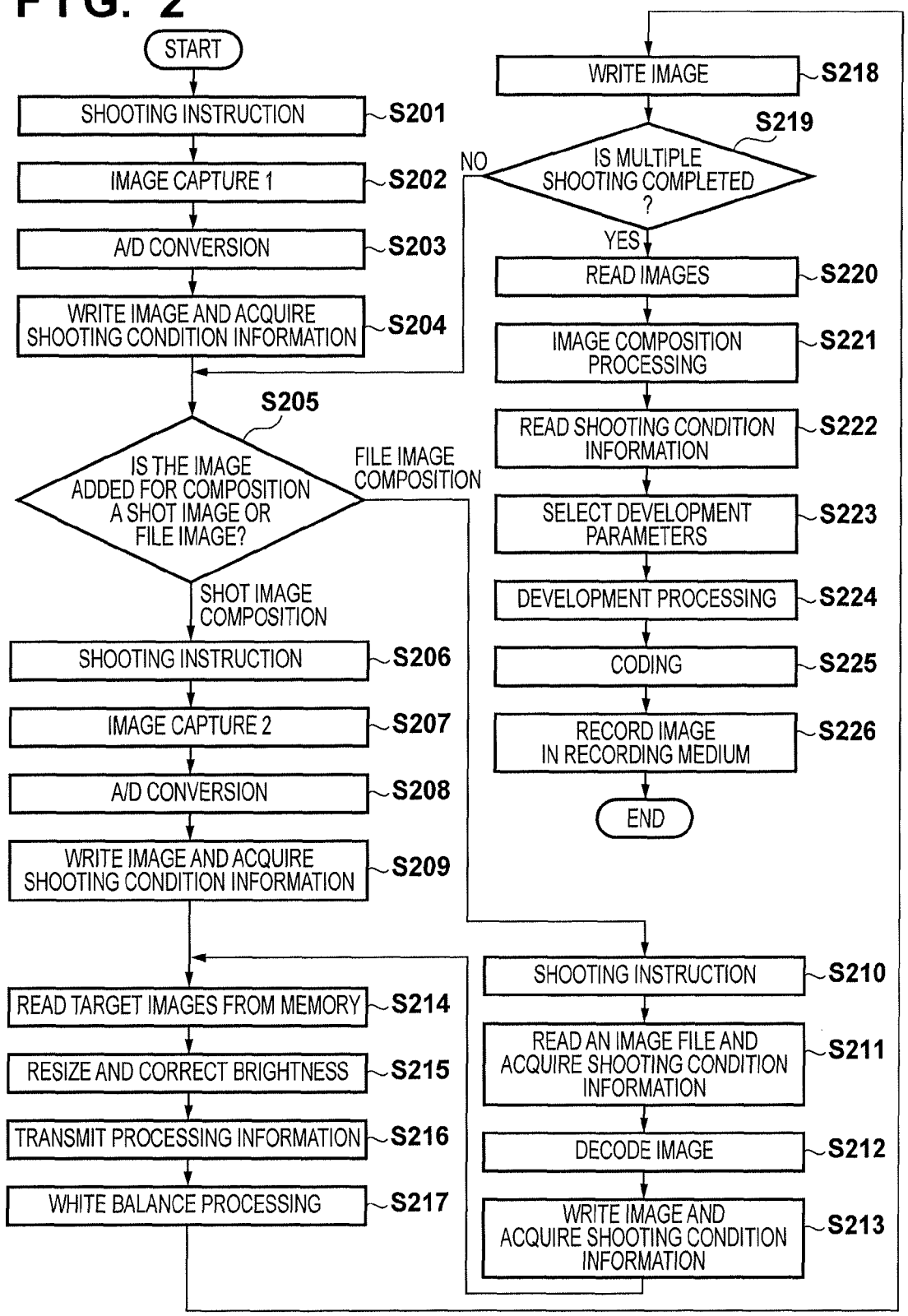
FIG. 2 is a flowchart showing a process of multiple shooting and a process of generating a composite image according to a first embodiment.

The process shown in FIG. 2 is implemented by the CPU 112 executing a firmware program recorded in the memory 104.

At s S201-S204 in FIG. 2, the CPU 112 causes the image capture control unit 114 to control the image sensor 101 to capture an object image according to a shooting instruction signal 111 from the operation input unit 110, and writes first image data 103 in a predetermined area of the memory 104 after the image data is converted to digital signal at the A/D conversion unit 102. Additionally at S204, the shooting condition acquisition unit 116 acquires the shooting condition information 117 used for shooting the first image from the image capture control unit 114 and sends the information to the CPU 112 and the development control unit 100. The CPU 112 in turn writes the shooting condition information as well as the first image data 103 in the memory 104.

Next, if receiving another shooting instruction signal 111 from the operating input unit 110, the CPU 112 writes second image data 103 obtained by the second multiple shooting in the memory 104 (S206-S209). Additionally at S209, the shooting condition acquisition unit 116 acquires the shooting condition information 117 used for shooting the second image from the image capture control unit 114 and sends the information to the CPU 112 and the development control unit 100. The CPU 112 in turn writes the shooting condition information as well as second image data 103 in the memory 104.

If the CPU 112 receives from the operation input unit 110 an instruction to designate an image file recorded in the recording medium 108 as containing the image data to be added with the image of the first shooting to generate a composite image (S205), the CPU 112 reads the image file 160 recorded in the recording medium 108, causes the decoding unit 161 to decode the file, and writes the decoded second image data 162 to the memory 104 (S210-S213). At S213, the shooting condition acquisition unit 163 acquires the shooting condition information 164 relating to the image file read out from the recording medium 108 and sends the information to the development control unit 100. The CPU 112 then writes the shooting condition information as well as the second image data 162 to the memory 104.

As the next step, the CPU 112 reads the first and second image data 130 recorded in the memory 104 (S214) and causes the resizing unit 131 and the brightness correction unit 133 to perform resizing and brightness correction (S215). The information about the resizing and the brightness correction based on the resizing control signal and the brightness correction control signal 119 is transmitted to the development control unit 100 (S216).

Then, the CPU 112 causes the WB processing unit 135 to perform white balance processing on the first and second image data 132 after the resize and the brightness correction (S217).

At this point, the CPU 112 writes in the memory 104 the third image data 134 obtained by processing the first image data and the fourth image data 134 obtained by processing the second image data (S218).

Then, if the multiple shooting (or the reading of an image file) is completed (S219), the CPU 112 causes the composition processing unit 151 to read the third and fourth image data 150 from the memory 104 (S220) and added the data to generate a composite image (S221).

Next, the CPU 112 causes the development control unit 100 to control development parameters according to the shooting condition information 117 and 164 (S223) and output to the development processing unit 141 a development control signal 125 to switch the development parameters.

The development processing unit 141 sets development parameters according to the development control signal 125 received from the development control unit 100 and performs development processing on the composite image data 152 (S224).

The processing at S223 and S224 will be described in further detail below.

The CPU 112 then causes the encoding unit 143 to generate an image file 144 from the final image data 142 obtained by the development processing at S224 (S225) and records the image file 144 in the recording medium 108 (S226).

Development Processing

Figure 3:
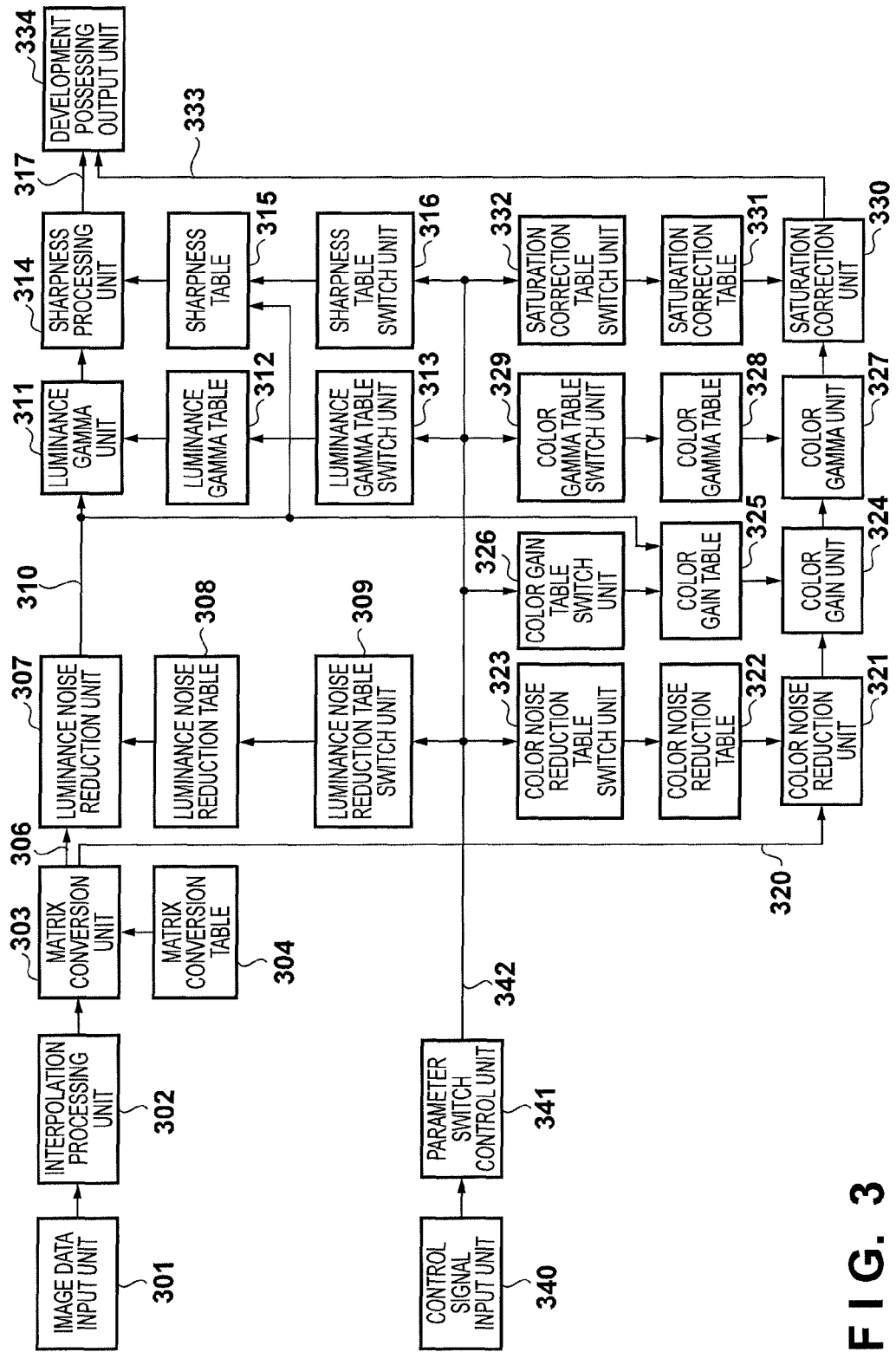
FIG. 3 is a block diagram showing a configuration of a development processing unit of the first embodiment.

With reference to FIG. 3, the configuration of the development processing unit 141 and the development processing at S224 of FIG. 2 will be described hereinafter.

Figures 7A, 7B, 7C, 7D:
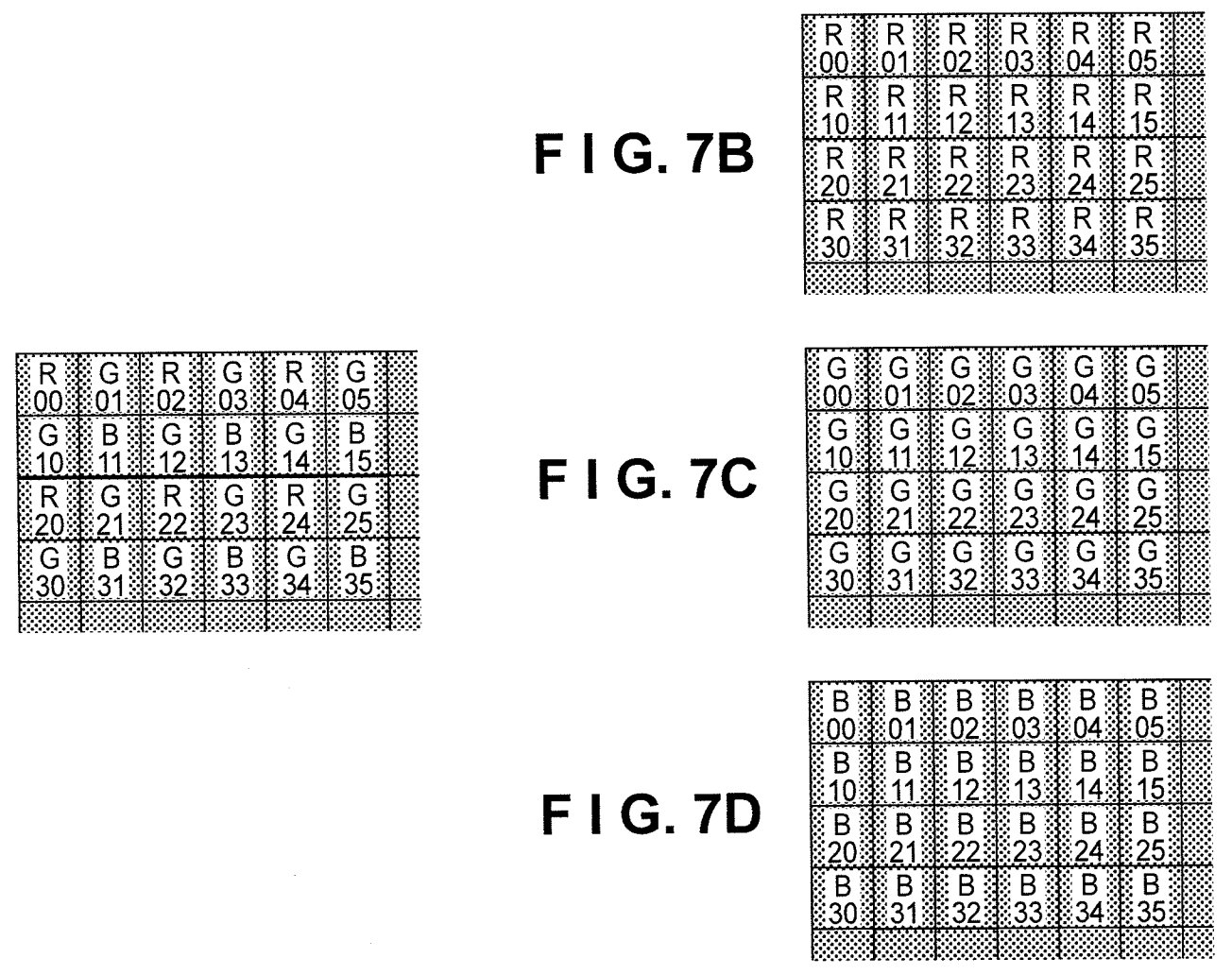

As shown in FIG. 7A, the composite image data 152 comprising red (R), green (G), and blue (B) pixels arranged in a Bayer array is inputted into an interpolation processing unit 302 via an image data input unit 301 as in the case of a RAW image data 140 obtained by a single image shooting.

Figures 7E, 7F, 7G, 7H, 7I, 7J:
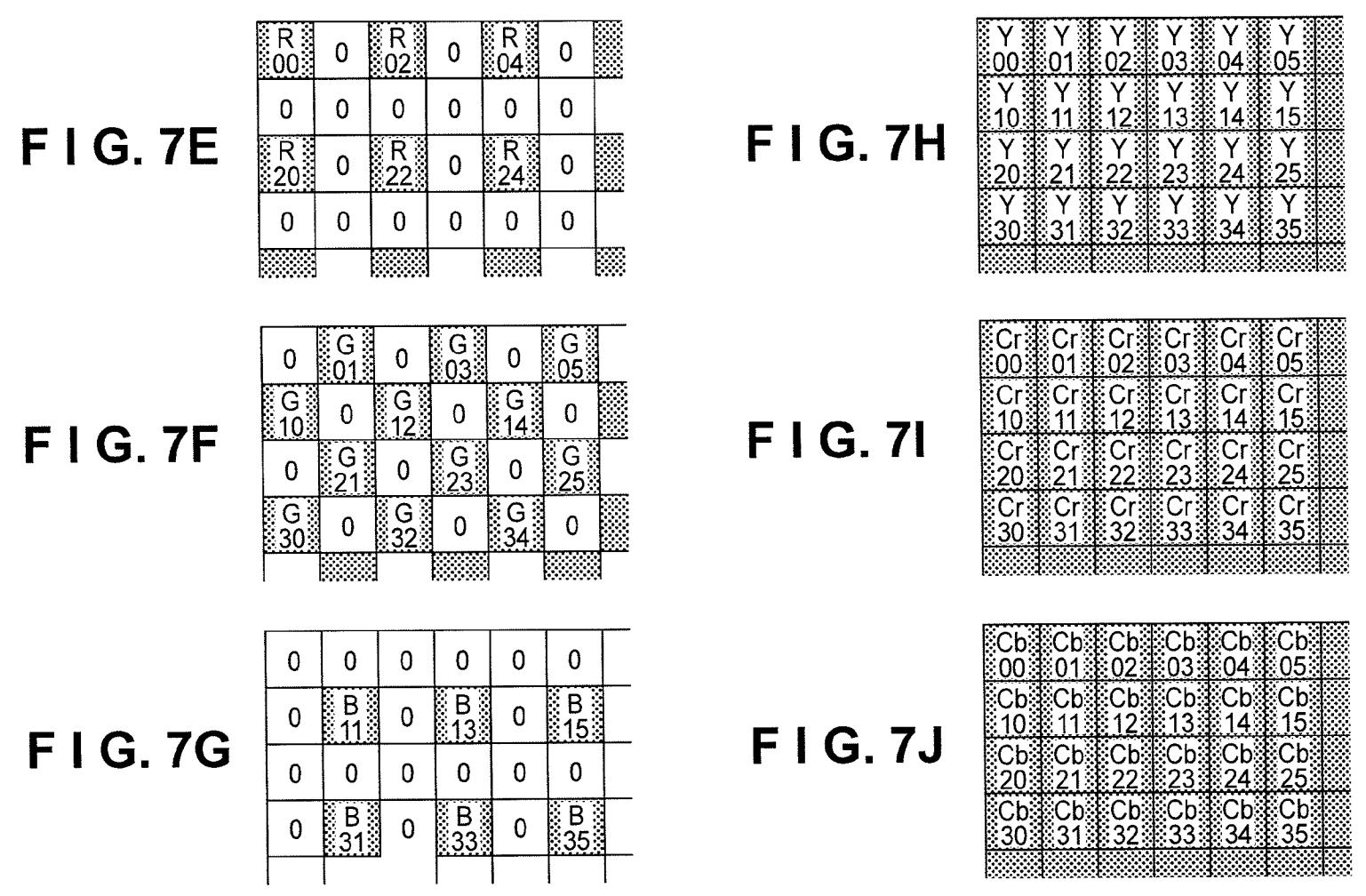

The interpolation processing unit 302 performs interpolation processing on the composite image data 152 to separate the pixels into image data of three R, G, and B planes shown in FIGS. 7B-7D and fill in the "0" spaces as shown in FIGS. 7E-7G. This provides each pixel with RGB information and these pixels are converted by a matrix conversion unit 303 to one-dimensional luminance signal Y (306) and two-dimensional color signals Cr and Cb as shown in FIG. 7H-7J (320). The 3×3 matrix coefficients used in this processing are given by a matrix conversion table 304. The matrix conversion table 304 is provided in advance as design values that are parameters optimized for the spectral characteristics of the RGB color filters of the image sensor 101.

The luminance signal Y (306) separated at the matrix conversion unit 303 is subjected to luminance noise reduction processing at a luminance noise reduction unit 307. In this luminance noise reduction processing, filtering is performed, for example, using a Gaussian filter having the low pass filter characteristics shown in FIG. 8A. Likewise, color noise reduction processing is performed on the color signals 320 at a color noise reduction unit 321.

The parameter used at the luminance noise reduction unit 307 is given by a luminance noise reduction table 308 and the parameter used at the color noise reduction unit 321 is given by a color noise reduction table 322. These parameters are provided in advance as optimized parameters in the tables 308 and 322 and controlled according to the parameter switch control signal 342 received from the parameter switch control unit 341.

The filter characteristics for the luminance signal may be the same as or different from those for the color signals, and design values suitable for the noise characteristics of the camera are used in this embodiment.

Figure 5:
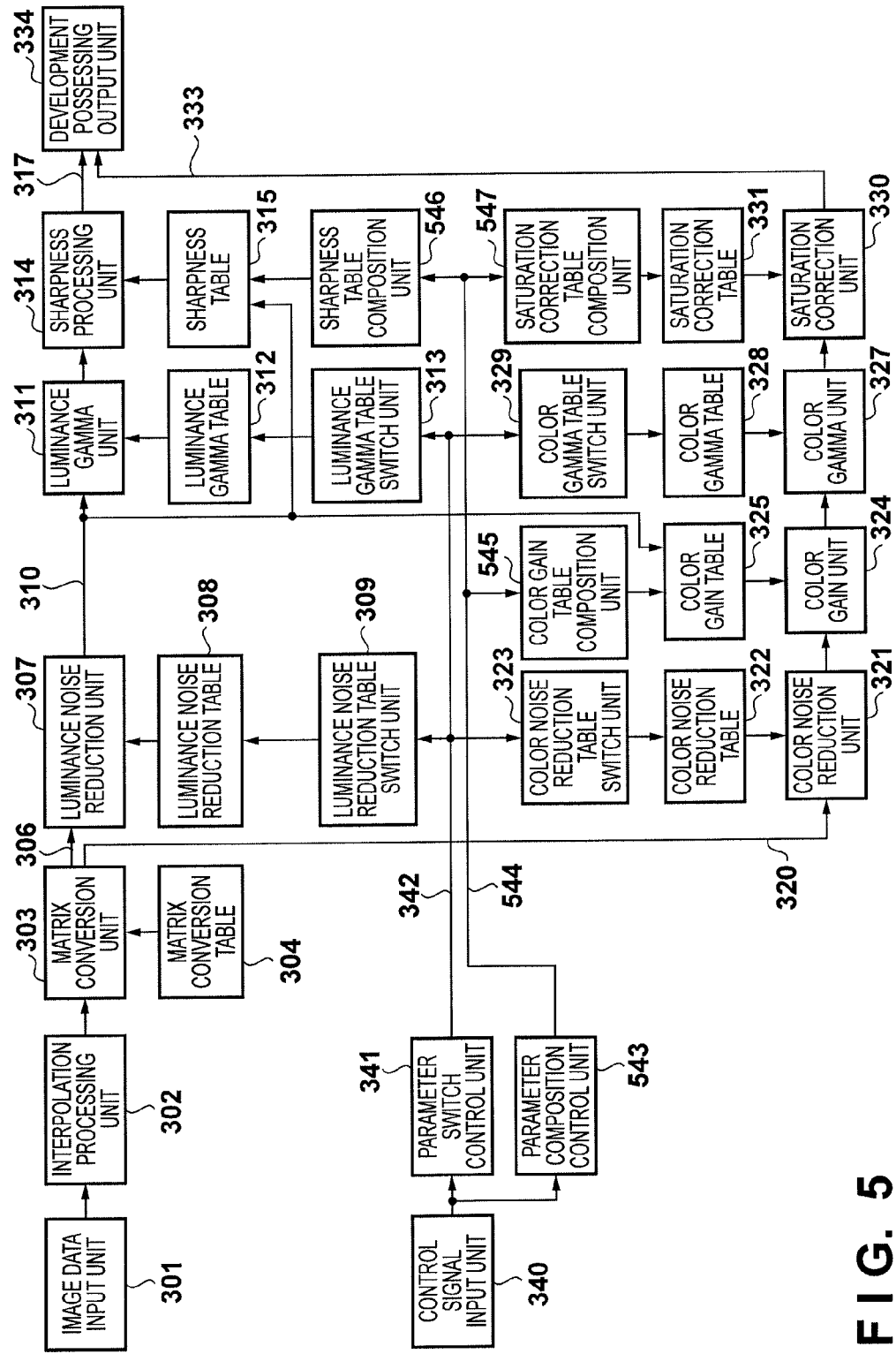
FIG. 5 is a block diagram showing a configuration of the development processing unit of the second embodiment.

The number of the taps of the filter may be, for example, 3×3 as in FIG. 8A, 5×5 as in FIG. 8B, 7×7 as in FIG. 8C, etc., and the noise reduction effect increases with the number of taps in the filter. Accordingly, a filter with an optimum number of taps is selected from the luminance noise reduction table 308 and the color noise reduction table 322 according to the amount of noise.

Figure 9A:
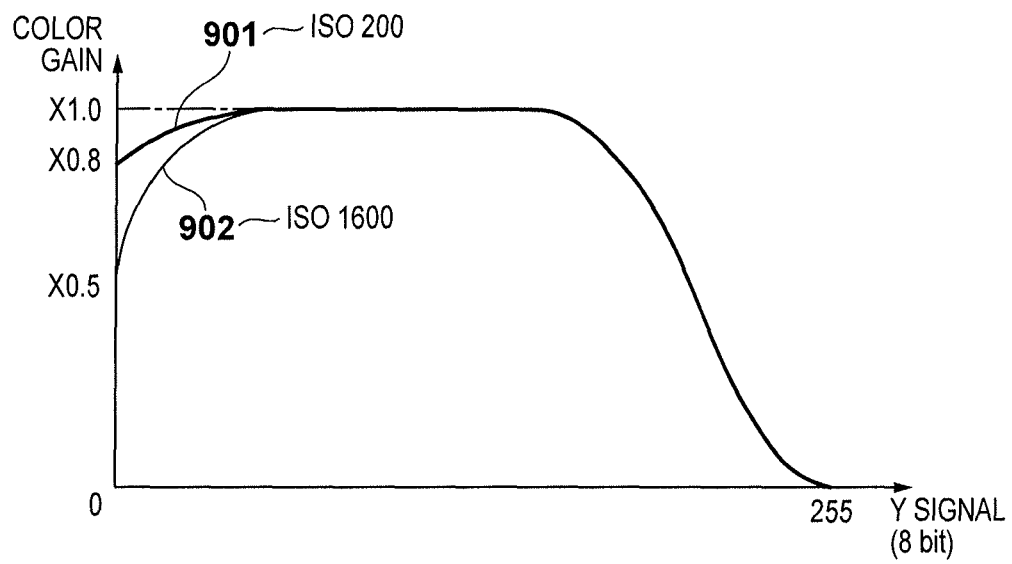
FIGS. 9A-9B illustrate examples of color gain characteristics with respect to luminance signals in color gain processing.

Next, in order to reduce the color signals 320 at the color gain unit 324 according to the magnitude of the luminance signal 310, gain processing is performed on the color signals by applying a negative gain. FIG. 9A shows color gain characteristics according to the embodiment for applying a negative gain to a low luminance portion of the luminance signal 310 to make the color noise of the image inconspicuous and applying a negative gain to a high luminance portion to enhance the appearance of the image and give the image vivid colors.

These color gains are also provided in advance in a color gain table 325 as optimized parameters and controlled for color according to the parameter switch control signal 342 received from the parameter switch control unit 341.

Next, nonlinear luminance gamma processing is performed on the luminance signal 310 at a luminance gamma unit 311, and nonlinear color gamma processing is performed on the color signals 320 at a color gamma unit 327.

Figures 10A, 10B:
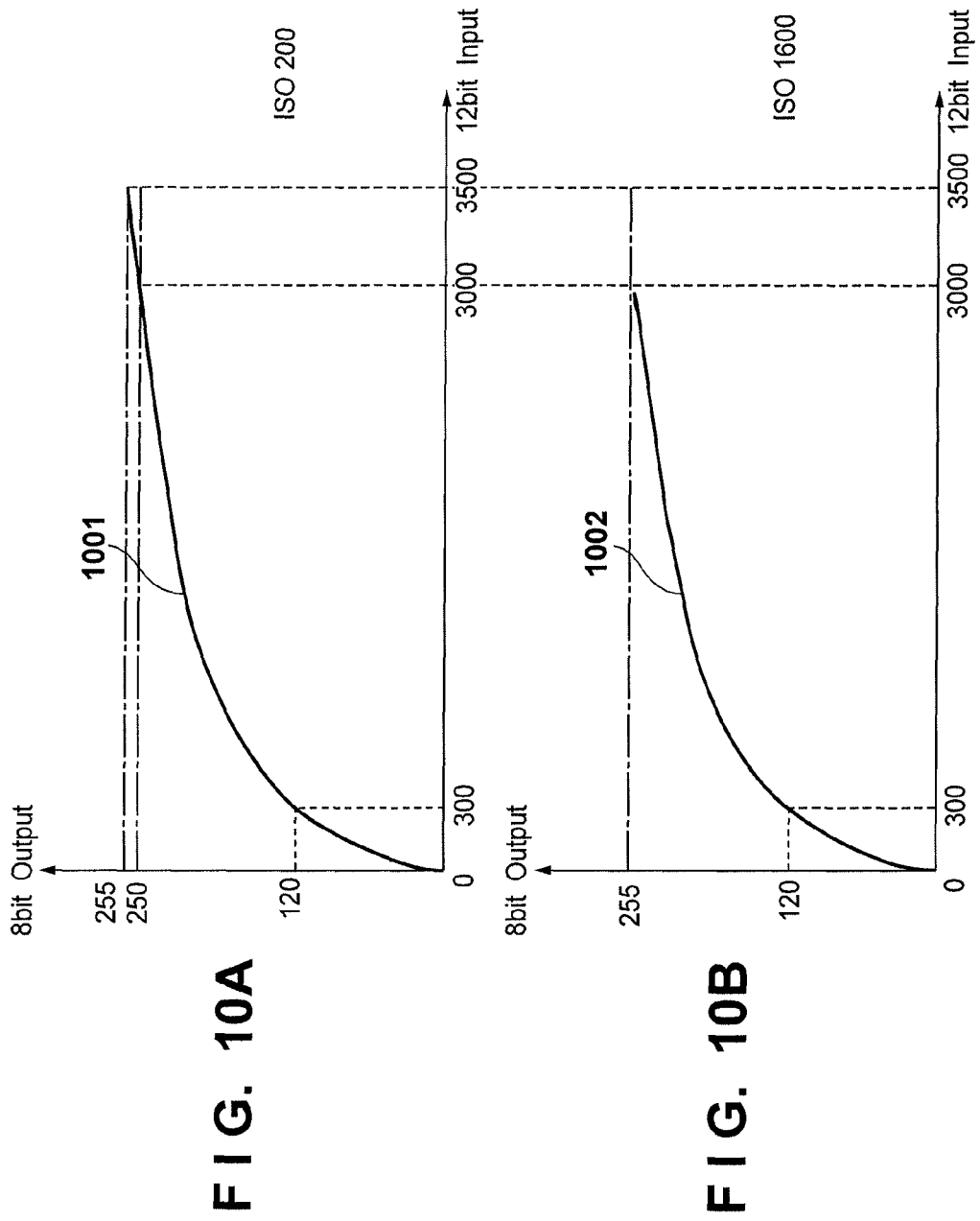
FIGS. 10A-10B illustrate examples of input/output characteristics of image data in luminance gamma processing and color gamma processing.

Luminance gamma characteristics are given by conversion tables representing the correlation between the output luminance with the input luminance shown in FIGS. 10A and 10B.

Color gamma characteristics are given by converting the color signals Cr and Cb with the luminance signal Y to RGB signals, for example, using the three-dimensional matrix conversion table for RGB→YCbCr represented by the equation (1) and using the color gamma table of FIG. 10A similar to the luminance gamma. Subsequently, Cr and Cb signals are obtained by performing matrix conversion using an inverse matrix of the equation (1) as shown in the YCbCr→RGB conversion table represented by the equation (2).

$$\begin{bmatrix} Y \\ Cr \\ Cb \end{bmatrix} = \begin{bmatrix} 0.2126 & 0.7152 & 0.0722 \\ 0.5000 & -0.4542 & -0.0458 \\ -0.1146 & -0.3854 & 0.5000 \end{bmatrix} \begin{bmatrix} R \\ G \\ B \end{bmatrix} \quad (1)$$

$$\begin{bmatrix} R \\ G \\ B \end{bmatrix} = \begin{bmatrix} 1.0000 & 1.5748 & 0.0000 \\ 1.0000 & -0.4681 & -0.1873 \\ 1.0000 & 0.0000 & 1.8556 \end{bmatrix} \begin{bmatrix} Y \\ Cr \\ Cb \end{bmatrix} \quad (2)$$

The gamma characteristics are provided in advance as optimized parameters in the luminance gamma table 312 and the color gamma table 328 and controlled according to the parameter switch control signal 342 received from the parameter switch control unit 341.

The gamma table varies to suite the dynamic range of the image sensor 101. For example, if the dynamic range is between 0-3500 (12 bits), the characteristics 1001 of FIG. 10A are used, whereas if the dynamic range is between 0-3000 (12 bits), the characteristics 1002 of FIG. 10B are used.

As the next step, in a sharpness processing unit 314, sharpness processing is performed on the luminance signal Y after the foregoing gamma processing in order to sharpen the image.

Figure 11A:
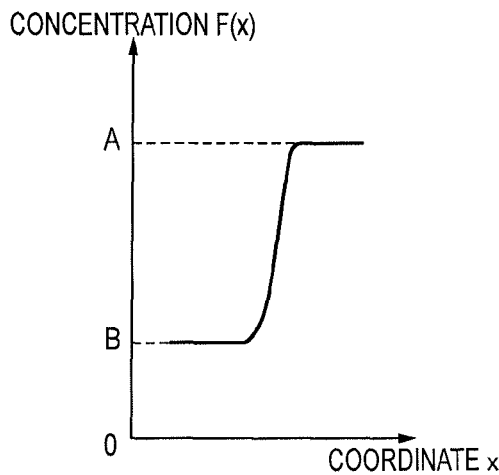
FIGS. 11A-11C illustrate examples of image data level characteristics in sharpness processing.
Figure 11C:
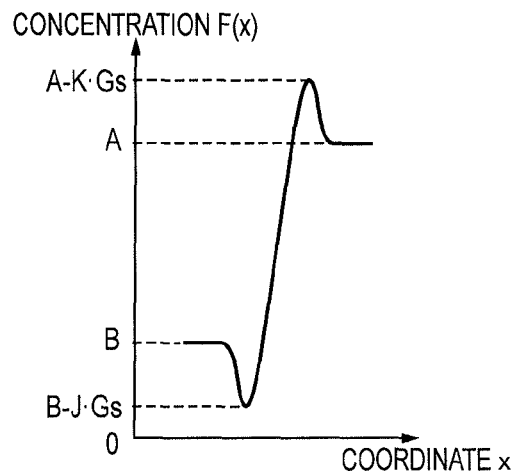

Sharpness characteristics shown in FIG. 11C are given to two-dimensional space coordinates.

Figure 11B:
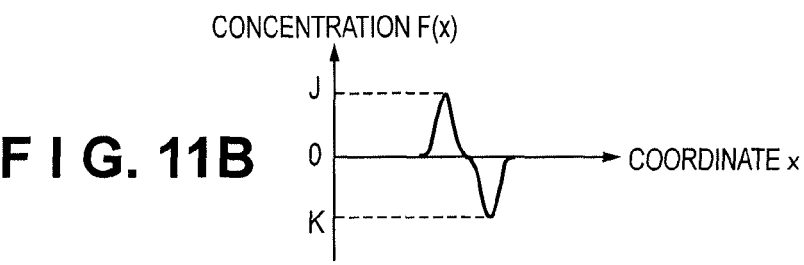

An edge component shown in FIG. 11B is detected by obtaining the second order differential coefficient of the spatial variation in the luminance level of the luminance signal Y shown in FIG. 11A. If the edge component is multiplied by a gain Gs and added to the original signal with its sign inverted, sharpness effect may be given to the image.

In this embodiment, a threshold th is set with respect to the absolute value (|A−B|) of the level difference (A−B) to determine whether or not to add the edge component to the original signal as follows:

If |A−B| is greater than th, then the edge component is added to the original image.

If |A−B| is less than or equal to th, then the edge component is not added to the original image.

By performing the foregoing processing, it becomes unlikely that the sharpness effect is given to low-level noise components.

If th-0<th-1, setting th-1 further reduces the sharpness effect.

Moreover, to reduce the sharpness effect on the noise in the low luminance areas of the image, a weight of negative gain is added to the gain Gs applied to the edge component of the luminance signal Y.

Figure 11D:
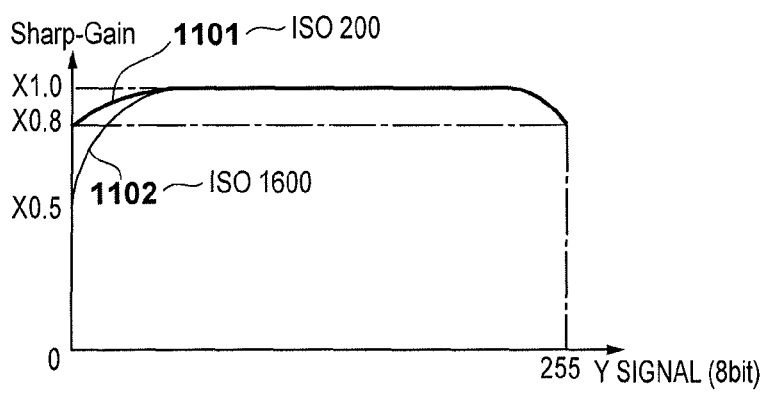
FIGS. 11D-11E illustrate examples of gain values of an edge enhancement component.

In order to enhance the appearance of the high luminance areas of the image, a weight of a negative gain is added to the gain Gs to reduce the sharpness effect. These gain variations are shown in FIG. 11D.

The sharpness characteristics are also provided in advance in a sharpness table 315 as optimized parameters and controlled according to the parameter switch control signal 342 received from the parameter switch control unit 341.

Lastly, the color signals Cr and Cb after the gamma processing are subjected to saturation correction at a saturation correction unit 330.

In the saturation correction, gain is eventually applied to the color signal components to give a desired finish to the appearance of the image.

As shown in FIG. 12A, according to saturation characteristics, linear gain is applied to the low saturation areas and low gain is applied to the high saturation areas to minimize color saturation.

The saturation characteristics are also provided in advance in a saturation correction table 331 as optimized parameters and controlled according to the parameter switch control signal 342 received from the parameter switch control unit 341.

The switching of development parameters according to the first embodiment will be described hereinafter.

The above-described development parameters are often changed depending largely on the amount of noise in the input image data. In other words, of the various shooting conditions, these parameters are selected depending largely on the sensitivity setting of the image sensor (i.e., the ISO speed).

In multiple shooting, if the ISO speeds of the data of the images added to generate a composite image at the composition processing unit 151 are different from each other, it is desirable to use the development parameters optimized for the higher ISO speed with the larger amount of noise.

For example, when adding the first image data shot at ISO 200 and the second image data shot at ISO 1600 to generate a composite image, the development parameters are controlled as follows:

It is assumed that the 3×3 tap filter of FIG. 8A and the 5×5 tap filter of FIG. 8B are provided for ISO 200 and ISO 1600, respectively, in the luminance noise reduction table 308. In this case, the development control unit 100 compares the ISO sensitivities of the first and second image data from the shooting condition information 117 and 164 and outputs a development control signal 125 to select the development parameters for the higher ISO speed or the ISO 1600.

In the development processing unit 141, the parameter switch control unit 341 outputs the parameter switch control signal 342 to a luminance noise reduction table switch unit 309 according to the development control signal 125. The luminance noise reduction table switch unit 309 selects the 5×5 tap filter for ISO 1600 of FIG. 8B from the luminance noise reduction table 308 and sends it to the luminance noise reduction unit 307.

In the same manner, it is assumed that the 5×5 tap filter of FIG. 8B and the 7×7 tap filter of FIG. 8C are provided for ISO 200 and ISO 1600, respectively, in the color noise reduction table 322. In this case, the 7×7 tap filter of FIG. 8C is sent out.

As shown in FIG. 9A, it is assumed that the color gain table 325 is provided with characteristics 901 for ISO 200 and characteristics 902 for ISO 1600, which apply a larger negative gain to the color components than the characteristics 901. In this case, the color gain table switch unit 326 switches to the parameter table with the characteristics 902 according to the parameter switch control signal 342 and sends it to the color gain unit 324.

It is also assumed that the characteristics 1001 for ISO 200 of FIG. 10A and the characteristics 1002 for ISO 1600 of FIG. 10B are provided in each of the luminance gamma table 312 and the color gamma table 328. In this case, the luminance gamma table switch unit 313 and the color gamma table switch unit 329 select the characteristics 1002 of FIG. 10B according to the parameter switch control signal 342 and sends it to the luminance gamma unit 311 and the color gamma unit 327.

At the sharpness processing unit 314, control is performed on the gains Gs and the thresholds th provided in the sharpness table 315. As shown in FIG. 11C, as for Gs (ISO200) and Gs (ISO1600) linearly applied to edge components, Gs (ISO200) is greater than Gs (ISO1600) to minimize the amplification of noise components. The sharpness table switch unit 316 selects Gs (ISO1600) according to the parameter switch control signal 342. In this embodiment, thresholds th (ISO200) and (ISO1600) are provided, in which the thresholds th (ISO200) is less than the threshold th (ISO1600). In this case, the threshold th (ISO1600) is selected according to the parameter switch control signal 342.

In addition, in the weighting table for Gs shown in FIG. 11D, from characteristics 1101 for ISO 200 and characteristics 1102, the characteristics 1102 for ISO 1600 is selected.

As shown in FIG. 12A, characteristics 1202 for ISO 1600 for minimizing increase in color noise as well as characteristics 1201 for ISO 200 are provided in the saturation correction table 331. The saturation correction table switch unit 332 selects the characteristics 1201 or 1202 from the saturation correction table 331 according to the parameter switch control signal 342.

Subsequently, the image data 317 after the foregoing sharpness processing and the image data 333 after the foregoing saturation correction is outputted from the development processing output unit 334.

As described above, according to this embodiment, even if multiple shooting is performed under conditions with different ISO speeds, the use of optimum development parameters ensures that appropriate development is carried out without increasing noise compared with single image shooting, thus providing a low-noise image.

Second Embodiment

A second embodiment will be described hereinafter with reference to FIGS. 4 and 5.

Figure 4:
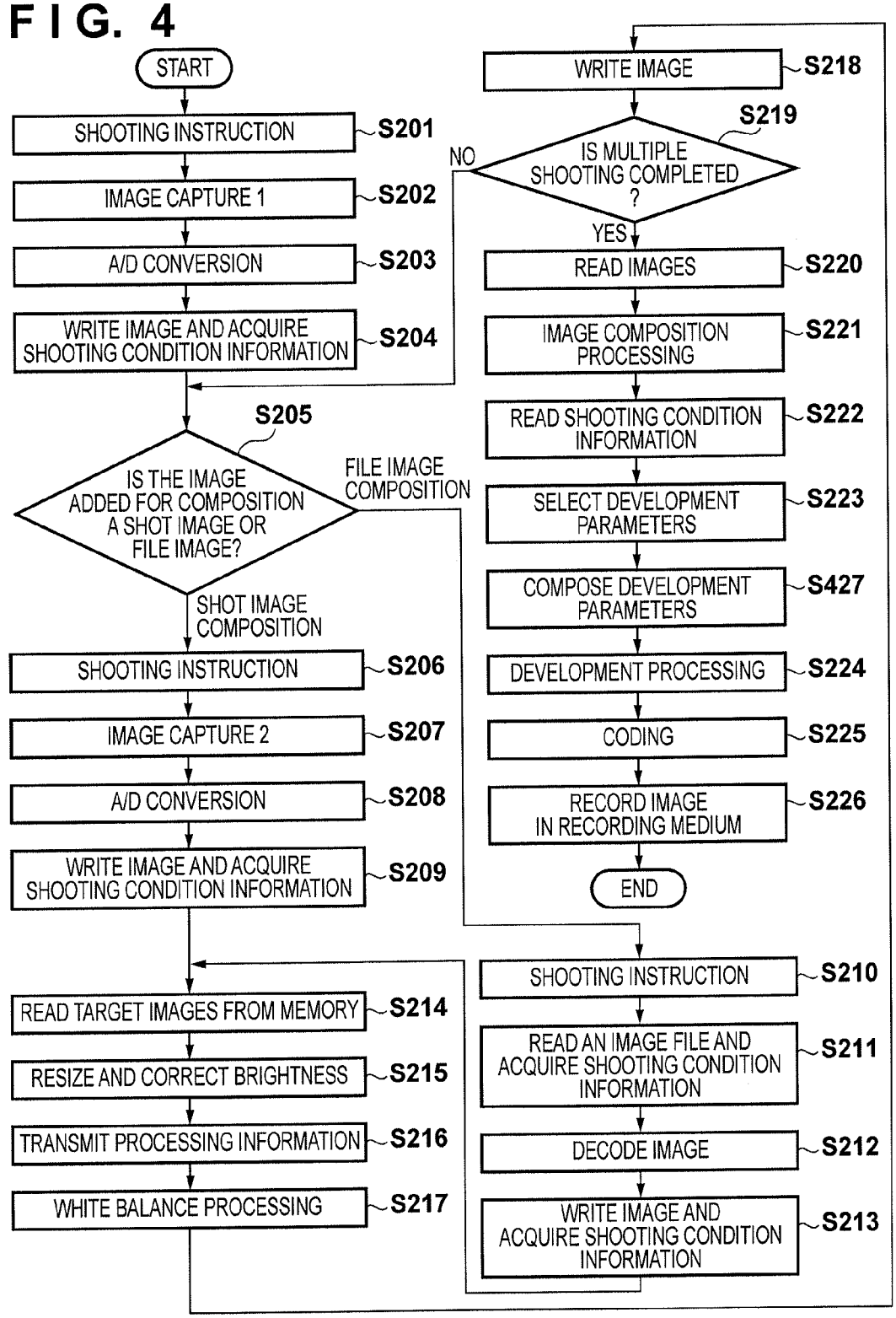
FIG. 4 is a flowchart showing a process of multiple shooting and a process of generating a composite image according to a second embodiment.

Note that, to focus the subsequent description on the features of the second embodiment that differ from the first embodiment, in FIG. 4, identical numerals/symbols are assigned to processes identical to those shown in FIG. 2, and, in FIG. 5, identical numerals/symbols are assigned to elements identical to those in FIG. 3 and description thereof is omitted.

In the development processing unit 141 shown in FIG. 5, a development control signal 125 is inputted into the parameter switch control unit 341 and a parameter composition control unit 543 from the control signal input unit 340.

According to this embodiment, the development parameters for the luminance noise reduction unit 307, the color noise reduction unit 321, the luminance gamma unit 311, and the color gamma unit 327 are provided as discrete tables with respect to the ISO speed settings of the image sensor 101. As in the first embodiment, the parameter tables are switched at the table switch units 309, 313, 323, and 329 in response to the parameter switch control signal 342 from the parameter switch control unit 341 according to the ISO speed setting (S223 of FIG. 4).

On the other hand, the color gain unit 324, the sharpness processing unit 314, and the saturation correction unit 330, all provided with tables that can be linearly interpolated with respect to the ISO speed, compose development parameters according to the ISO speed (S427 in FIG. 4) in response to a control signal 544 from the parameter composition control unit 543.

First, as for the color gain unit 324, a color gain table composition unit 545 calculates parameter composition conditions from the shooting conditions of each shot of multiple shooting, composes a color gain table 325 according to the calculated composition conditions, and generates new color gain characteristics.

Figure 9B:
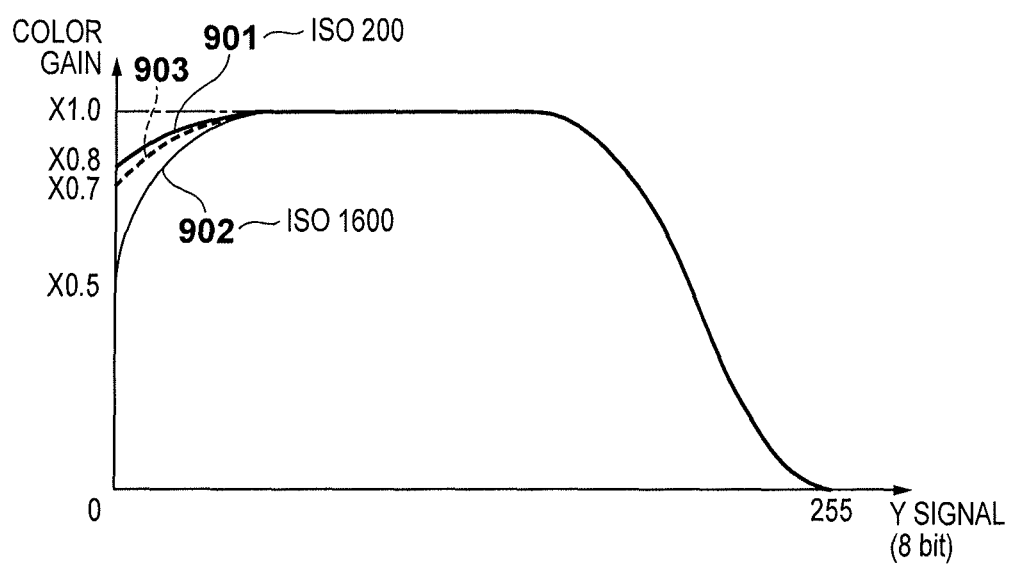

Assuming that the characteristics 901 of FIG. 9B is for ISO 200 and the characteristics 902 is for ISO 1600, to add a shot at ISO 200 and a shot at ISO 1600 to generate a composite image, parameters are calculated to provide characteristics having an intermediate gain between the characteristics 901 and the characteristics 902.

Furthermore, if an image is composed from two shots at ISO 200 and one shot at ISO 1600, parameters are calculated to provide characteristics 903 by dividing internally the characteristics 901 and the characteristics 902 in a ratio of 2:1.

In this way, a table of color gain characteristics composed by interior division processing in a predetermined ratio is provided to the color gain unit 324.

As for the sharpness processing unit 314, a sharpness table composition unit 546 calculates parameter composition conditions from the shooting conditions of each shot of multiple shooting, composes a sharpness table 315 according to the calculated composition conditions, and generates new sharpness characteristics.

Figure 11E:
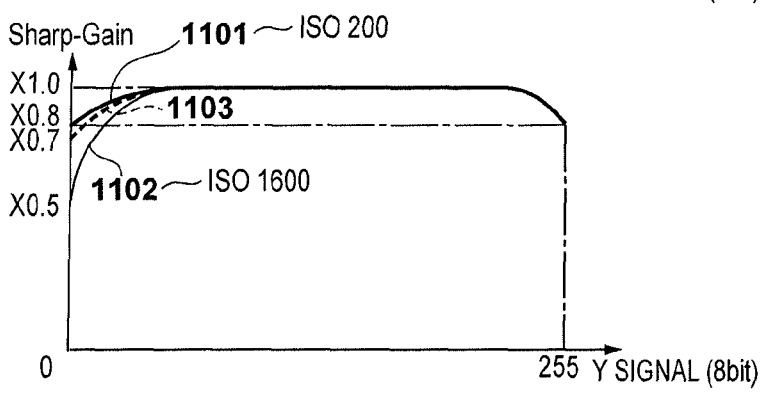

In addition, in the weighting table for Gs shown in FIG. 11E, the characteristics 1103 are calculated by dividing internally the characteristics 1101 for ISO 200 and the characteristics 1102 for ISO 1600 in a ratio corresponding to the number of shots in the multiple shooting as in the foregoing color gain processing.

In the case of multiple shooting consisting of three shots (two shots at ISO 200 and one shot at ISO 1600), gain Gs is calculated by interior division in a ratio of 2:1 as Gs=(Gs(ISO 200)×2+Gs(ISO 1600))/3.

Likewise, the threshold th is also calculated by interior division in a ratio of 2:1 as th=(th(ISO 200)×2+th(ISO 1600))/3.

In this way, a table of sharpness characteristics composed by interior division processing in a predetermined ratio is provided to the sharpness processing unit 314.

As for the saturation correction unit 330, a saturation correction table composition unit 547 calculates parameter composition conditions from the shooting conditions of each shot of multiple shooting, composes a saturation correction table 331 according to the calculated composition conditions, and generates new saturation correction characteristics.

Assuming that the characteristics 1201 of FIG. 12B is for ISO 200 and the characteristics 1202 is for ISO 1600, to add two shots at ISO 200 and one shot at ISO 1600 to generate a composite image, parameters are calculated that provides the characteristics 1203 obtained by dividing internally the characteristics 1201 and the characteristics 1202 in a ratio of 2:1.

A table of a saturation correction characteristics composed by the foregoing operations is provided to the saturation correction unit 330.

As described above, according to this embodiment, even if multiple shooting is performed under shooting conditions with different ISO sensitivities, new development parameters are generated by reaching a proper balance among the shooting conditions of the shots. Although this increases noise compared to the first embodiment, the second embodiment is capable of providing images reflecting optimum development parameters that achieve a proper balance among the shots of multiple shooting.

Third Embodiment

A third embodiment will be described hereinafter with reference to FIG. 6.

In the first embodiment, the parameter switch control unit 341 of FIG. 3 automatically outputs a parameter switch control signal 342 according to the ISO speed setting. In contrast, according to the third embodiment, the development control unit 100 performs parameter switching control in response to an instruction to switch the parameter table issued by the user via the operation input unit 110.

Note that, to focus the subsequent description on the features of the third embodiment that differ from the first and second embodiments, in FIG. 6, identical numerals/symbols are assigned to processes identical to those shown in FIGS. 2 and 4 and description thereof is omitted.

Referring to FIG. 6, the processing at S201-S221 are identical with those in FIGS. 2 and 4.

Subsequently, the development control unit 100 sets predetermined default development parameters (for example, for ISO 100) (S628), and the development processing unit 141 performs development processing using the development parameters set at S628 (S224).

Next, the CPU 112 displays the developed image data on the display device 145 (S629).

The user then views the image displayed on the display device 145 and determines whether or not the image is properly developed. If determining that the image is inadequately developed, the user issues an instruction for switching the parameter tables via the operation input unit 110, and the development control unit 100 sets the development parameters for a different ISO speed (S628). As this embodiment allows the user to set the development parameters at the development processing unit 141, the user may perform fine adjustments to suit his preference. This, however, may result in too many parameters for the user to manage. As an alternative, for example, the entire parameters may be switched for each ISO speed or a different set of parameters may be provided in which parameter settings are assembled.

In this manner, once obtaining an optimum image after repeating the process of switching the development parameter setting and viewing the displayed image for each setting, the user issues an instruction for recording the developed image via the operation input unit 110. Upon receiving this recording instruction, the CPU 112 causes the encoding unit 143 to generate an image file from the developed composite image data 152 (S225) and records the file in the recording medium 108 (S226).

As described above, according to this embodiment, even if multiple shooting is performed under shooting conditions with different ISO speeds, the user can view the displayed image and switch the development parameters via the operation input unit 110 if determining the image is inadequate. This enables fine adjustments of image quality to suit the preference of the user.

The foregoing embodiments have been described with the ISO speed as the exemplary shooting conditions. However, even if other shooting conditions are used, the development parameters may be likewise switched or composed if the development parameters require changes.

Furthermore, in addition to the shooting conditions, a resizing control signal and/or a brightness correction control signal 119 may be sent to the development control unit 100 so that the degree of sharpness may be increased with the resize rate, or a development control signal 125 may be outputted to the development processing unit 141 so as to select a table for increasing the saturation correction when increasing the brightness of the image by brightness correction.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-097999, filed May 7, 2013 which is hereby incorporated by reference herein in its entirety.

What is claimed is:

1. An image capturing apparatus comprising:
an image capturing unit configured to capture images by an image sensor;
an acquisition unit configured to acquire information relating to sensitivities of the image sensor used for capturing the images;
a composition unit configured to add a plurality of images for generating a composite image; and
a development processing unit configured to perform development processing of data of the composite image generated by the composition unit;
wherein a plurality of parameters having different characteristics corresponding to the sensitivities of the image sensor are provided as the parameters used for the development processing;
further comprising a control unit configured to perform controlling to compare the sensitivities used for shooting the plurality of images and set a parameter corresponding to the highest sensitivity of the plurality of parameters as the parameter used for the development processing.

2. The apparatus according to claim 1, wherein the plurality of images added by the composition unit includes an image captured by the image capturing unit and an image decoded from an image file that has been already recorded.

3. The apparatus according to claim 1, wherein the development processing includes at least one of luminance noise reduction processing, color noise reduction processing, luminance gamma processing, color gain processing, color gamma processing, sharpness processing, and saturation correction processing,
a plurality of parameters are provided for each of the different types of development processing, and
the development processing unit includes a parameter switch unit configured to select a predetermined parameter from the plurality of parameters.

4. The apparatus according to claim 3, wherein the development processing is a nonlinear processing.

5. A control method of an image capturing apparatus which has an image capturing unit for capturing images by an image sensor, an acquisition unit configured to acquire information relating to sensitivities of the image sensor used for capturing the images, a composition unit configured to add a plurality of images for generating a composite image, and a development processing unit configured to perform development processing of data of the composite image generated by the composition unit; the method comprising the steps of:
providing a plurality of parameters having different characteristics corresponding to the sensitivities of the image sensor as the parameters used for the development processing, and
performing controlling to compare the sensitivities used for shooting the plurality of images and set a parameter corresponding to the highest sensitivity of the plurality of parameters as the parameter used for the development processing.

6. A non-transitory computer-readable storage medium storing a program for causing a computer to execute the control method according to claim 5.

* * * * *